United States Patent [19]

Kawashima

[11] Patent Number: 5,428,674
[45] Date of Patent: Jun. 27, 1995

[54] COMMUNICATION TERMINAL DEVICE AND DIALING KEY

[75] Inventor: Shoji Kawashima, Kurume, Japan

[73] Assignee: Matsushita Electric Industrial Co., Ltd., Osaka, Japan

[21] Appl. No.: 195,032

[22] Filed: Feb. 14, 1994

[30] Foreign Application Priority Data

Feb. 16, 1993 [JP] Japan .................. 5-026421

[51] Int. Cl.6 .................. H04M 11/00; H04M 1/00
[52] U.S. Cl. .................. 379/100; 379/322; 379/368
[58] Field of Search .................. 379/100, 93, 94, 96, 379/97, 98, 322, 323, 324, 413, 355, 368, 369, 370; 341/22, 23, 34; 200/5 A, 341, 512, 517

[56] References Cited

U.S. PATENT DOCUMENTS

| | | | |
|---|---|---|---|
| 4,349,712 | 9/1982 | Michalski | 200/517 |
| 4,567,469 | 1/1986 | Danish et al. | 341/23 |
| 4,771,139 | 9/1988 | DeSmet | 200/5 A |
| 4,862,499 | 8/1989 | Jekot et al. | 379/368 |
| 4,916,732 | 4/1990 | Kotani et al. | 379/100 |
| 5,289,533 | 2/1994 | Wasio et al. | 379/100 |

Primary Examiner—Curtis Kuntz
Assistant Examiner—Jason Chan
Attorney, Agent, or Firm—Stevens, Davis, Miller & Mosher

[57] ABSTRACT

A communication terminal device including a first switch provided between a button and an intermediate member, and a second switch provided below the intermediate member such that when the button is depressed, both the first and second switches are surely switched on. Both the switches are electrically insulated from each other. Wiring is made such that one of those switches may operate a telephone circuit connected directly to a telephone line while the other switch may operate a main communication unit operating with a commercial power source. Even when the commercial power source is interrupted due to a power stoppage, at least the telephone circuit is operable, so that the terminal device is capable of fulfilling at least the function of a telephone set and ensuring insulation between the telephone unit and the main communication unit.

8 Claims, 7 Drawing Sheets

COMMUNICATION TERMINAL DEVICE AND DIALING KEY

BACKGROUND OF THE INVENTION

The present invention relates to a communication terminal device which is driven normally by a commercial power source and capable of making telephone communication, using a power supply provided on the side of communication lines at a power stoppage, and a dialing key.

A communication terminal device such as a facsimile device, using a commercial power source, have become widespread. The terminal device of some type is provided with both the function of using a commercial power source (facsimile communication, message record/reproduction, etc.) and the function of a normal telephone set.

Among these terminal devices, there is provided a type of terminal device in which both of the functions as mentioned above are not operated during power failure, and a type of terminal device in which the function of using a commercial power source is not available but the function of a normal telephone set is available. In the latter type of terminal device, it is necessary to provide a safety circuit and to separate the commercial power source electrically, and upon power failure, a telephone set circuit is separated for example through a relay to supply power to the telephone set circuit from the communication line. A ten-key unit of the terminal device which dials a telephone number has a switch which sends a signal to a microcomputer which operates with the commercial power source and a switch which sends a signal to a circuit operating with the communication lines. Depression of one button of the ten-key unit operates those two switches to switch the circuit concerned, depending on whether power supply to the terminal device has now been stopped or not in order to cope with the power stoppage.

Figure 10:
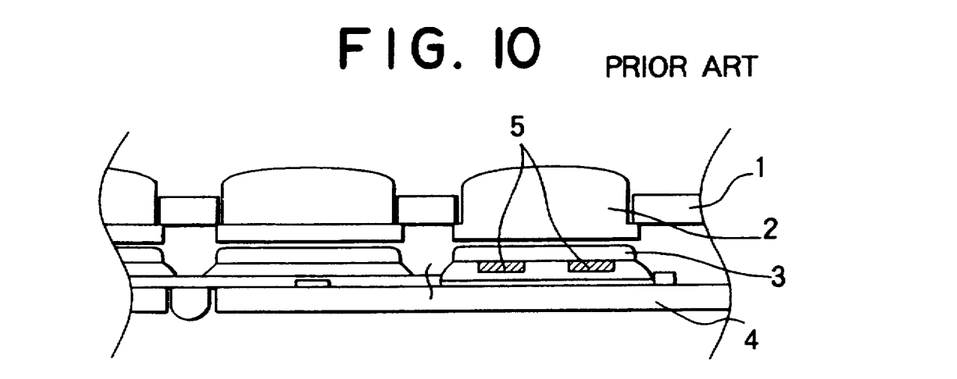
FIG. 10 is a partially cross-sectional view of a conventional dialing key.
Figure 11:
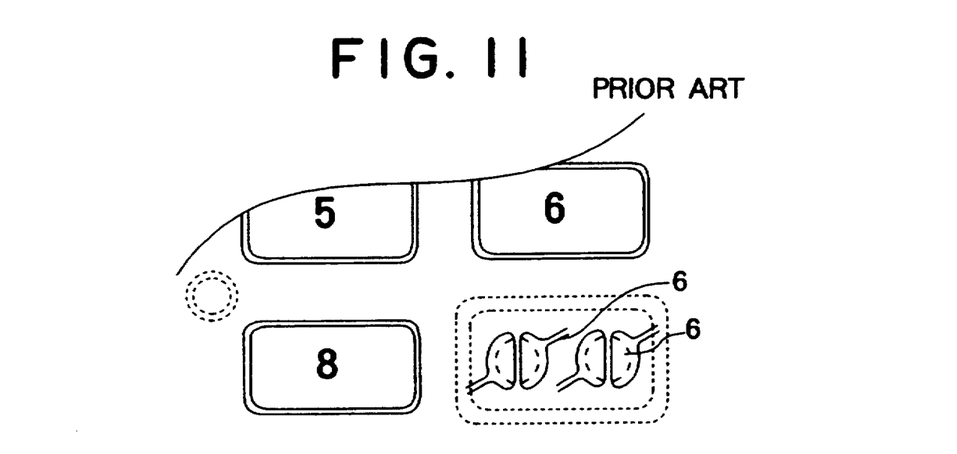
FIG. 11 is a partial plan view of the conventional dialing key.

As shown in FIGS. 10 and 11, a conventional dial section is provided with a panel 1 and buttons 2 attached to the panel 1 so as to protrude partially from the panel. When a button 2 is depressed, a contact 3 made of an elastic material such as rubber is collapsed to come into contact with a printed wiring board 4. The contact 3 has two circular electrodes 5 printed with electroconductive ink on a lower surface thereof such that an electric current can flow across those electrodes. The electrodes 5 come into contact with a switch 6 formed in a pattern on the board 4 to switch on the switch 6.

For the printing process for the formation of the switches, that system as just mentioned above is capable of forming both the first and second switches simultaneously, so that the cost taken for carrying out that process is very low, advantageously.

However, the telephone dial requires 12 switches and a double-sided printed wiring board 4 is required for forming wiring patterns one on each of both the surfaces thereof to thereby form 12 switches independent of a circuit involving the 12 dial switches because wiring for the individual switches is difficult if the wiring pattern is formed on only one surface of the printed board. This would increase the cost of the device manufacture.

When the button 2 is depressed at one edge, it would be pushed obliquely. Thus, the phenomenon is likely to occur that only one of the two switches is switched on while the other is not switched on. In order to avoid such situation, limitations to design of the device would occur. For example, the finish of the panel 1 which guides the sliding movement of the button 2 would require high accuracy, undesirably.

Further, it is necessary to provide sufficient length intervals for electrical insulation of conductive patterns from patterns used for power failure. In a large sized switch, particularly the problem as mentioned above often happens. There also arises a problem of restriction on design.

SUMMARY OF THE INVENTION

The present invention is made in view of the problems with the conventional technique. It is an object of the present invention to provide an inexpensive communication terminal device with a telephone having a power stoppage dialing function stabilized in operation at all times and a small sized switch, and a dialing key.

In order to achieve the above object, the dialing key of the invention includes a button which the user is able to depress, a first switch and a second switch which are arranged in a line such that the pressure applied to the button is applied to the first switch and then to the second switch through the first switch to thereby switch on the first and second switches together.

This arrangement operates such that depression of one button switches on the two switches concerned.

DESCRIPTION OF THE PREFERRED EMBODIMENTS

Figure 1:
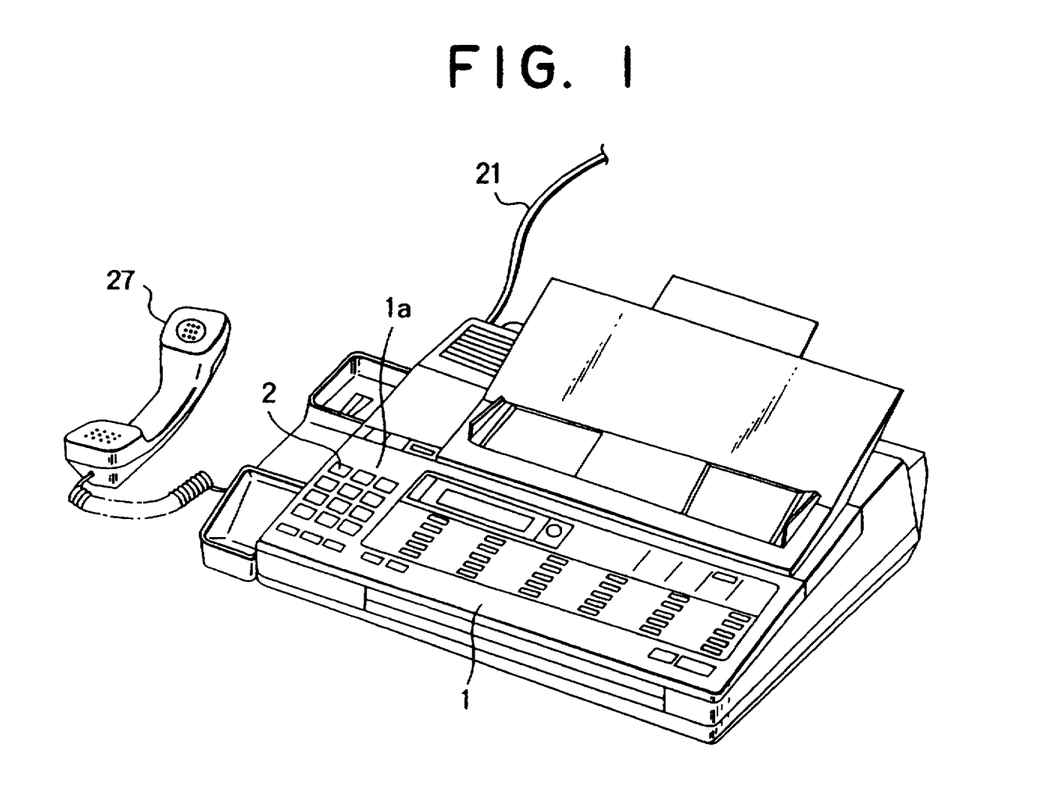
FIG. 1 is a perspective view of a communication terminal device as one embodiment of the present invention.

An embodiment of a communication terminal device and a dialing key according to the present invention will be described with respect to the drawings. A facsimile device will be described as an embodiment of the inventive communication terminal device. FIG. 1 shows the appearance of the facsimile device as the embodiment. A facsimile communication unit or a telephone unit provided therefor is selectively connected automatically to telephone lines.

Figure 2:
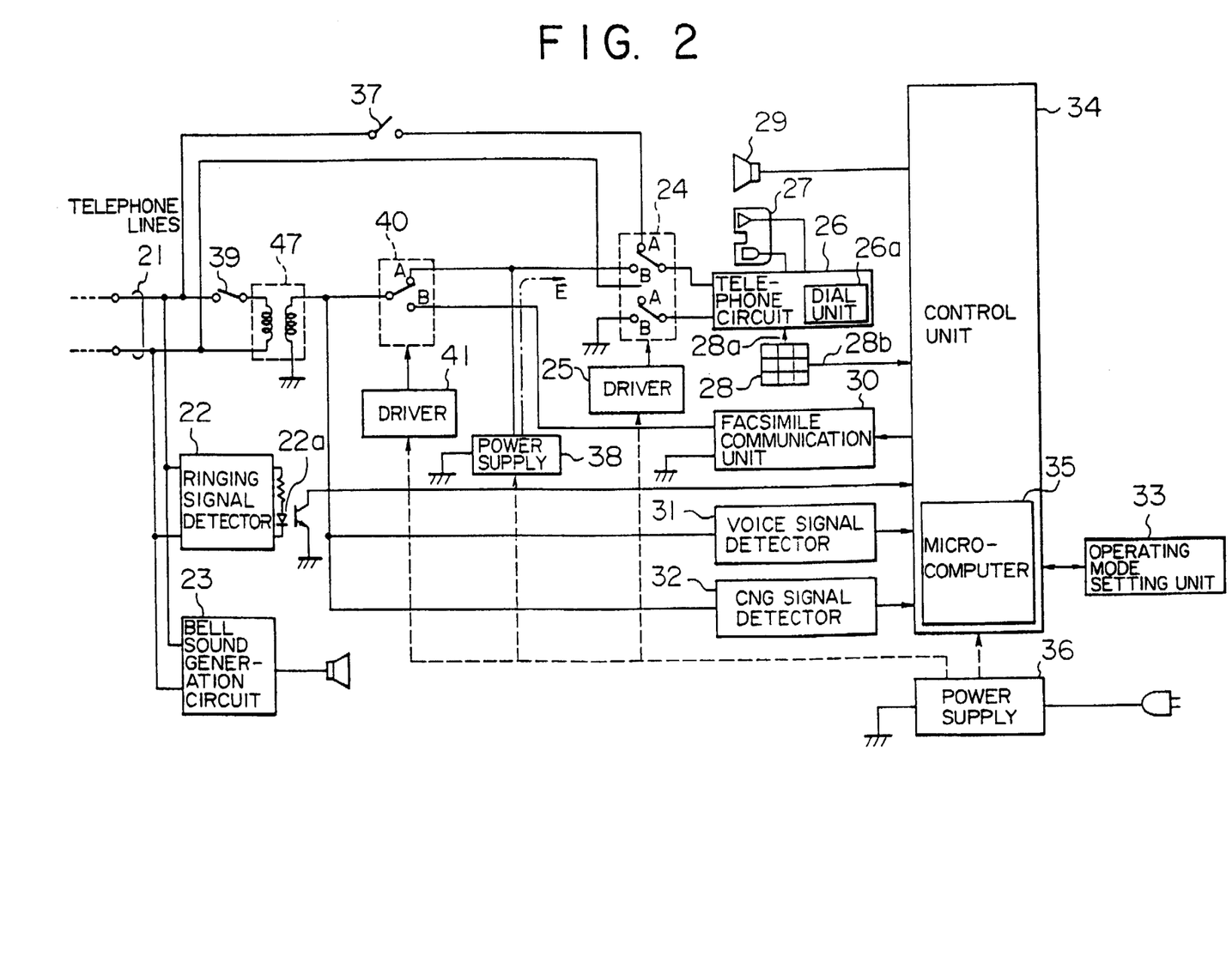
FIG. 2 is a block diagram of the communication terminal device.

FIG. 2 is a block diagram of the facsimile device. In FIG. 2, reference numeral 21 denotes telephone lines;

22, a ringing signal detector which detects a ringing signal incoming from a telephone office via the telephone lines (for example, when the detector 22 detects two ringing signals, it outputs an output signal); a photo-coupler 22a is connected to an output of the ring signal detection circuit 22 which electrically separates the telephone lines from a control unit; 23, a bell sound generation circuit connected to the telephone lines 21; 24, a line switch; 25, a driver for the line switch 24; 26, a telephone circuit with a voice communication circuit including an amplifier; 27, a handset; 28, a dialing key; and 29, a speaker.

Reference numeral 30 denotes a facsimile communication unit which makes facsimile communication; 31, a voice signal detector; 32, a CNG signal detector which detects a CNG signal incoming via the telephone lines 21; 33, an operating mode setting unit which sets a voice terminal communication mode or a facsimile communication mode on the basis of information set by the user; 34, a control unit; 35, a microcomputer provided in the control unit 34; 47, a circuit line transformer for isolating the facsimile communication unit 30, the audio signal detection circuit 31, the CNG signal detection circuit 32 and the control unit 34 from the telephone lines 21 with respect to a d.c. current; and 36, a power supply which uses a commercial power source to supply power to the elements concerned of the facsimile device.

The voice signal detector 31 is provided on the primary side of the line switch 24 to start facsimile communication in accordance with a signal from the voice signal detector 31 when the lines 21 are mute for more than a predetermined time.

The line switch 24 is driven by the driver 25. A pair of movable contacts of the switch 24 is in contact with a corresponding pair of fixed contacts A in which the telephone circuit 26 is connected directly to the telephone lines 21 and separated from a circuit to which power is supplied from the power source circuit 36, resulting in disconnection of the facsimile communication unit 30 from the telephone lines 21.

In the event that a call is generated in the state as mentioned above, when a user performs an off-hook, an off-hook switch 37 is turned on and the telephone lines 21 are connected to the telephone circuit 26 so that power is supplied from the telephone lines 21 to the telephone circuit 26. When the user depresses a dial button, a signal is outputted from the dial key unit 28 and a dial signal produced from a dial unit 26a of the telephone circuit 26 is sent to the telephone line 21 through the line switch 24 and the off-hook switch 37.

When power is supplied to the terminal device, the drive unit 25 is supplied with power from the power supply circuit 36 and causes the line switch 24 to be switched from a side A to a side B. With a pair of contact pieces of the line switch 24 being switched to the side B, the telephone circuit 26 is connected to a circuit operative to be supplied with power from the power source circuit 36.

With a pair of contact pieces of the line switch 24 being switched to the side B, power is supplied from the power source circuit 36 to the telephone circuit 26 through the power source circuit 38 along a path as shown by a dotted line. The dial unit 26a of the telephone circuit 26 is reset and disabled. In the event a call is generated in this state, when the user performs an off-hook, the switch 39 is turned on and closed. When the user depresses the dial button, a signal is outputted from the dial key unit 28 to the control unit 34. According to generation of this signal, the control unit 34 allows the facsimile communication unit 30 to produce a dial signal which is in turn sent to the telephone line 21 through a switch 40, the line transformer 47 and the switch 39. The switch 40 is driven by a driver circuit 41 and changed to the side A during telephone communication and further changed to the side B during sending of the dial signal and during facsimile transmission.

Figure 3:
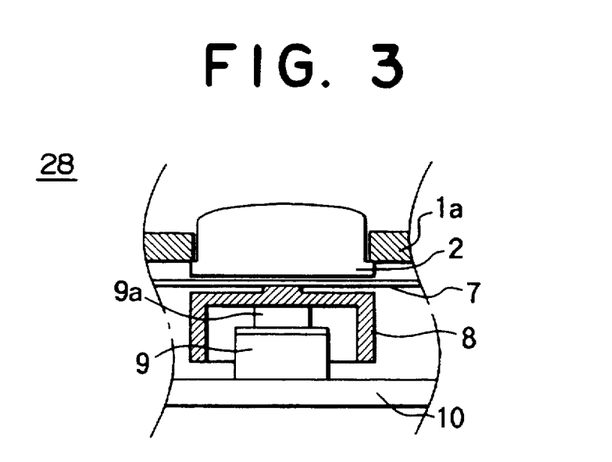
FIG. 3 shows the structure of a dialing key as one embodiment of the present invention.

FIG. 3 is a cross-sectional view of the dialing key 28 of the facsimile device. In FIG. 3, reference numeral 1a denotes an upper panel of a resin cabinet 1 (shown in FIG. 1) of the facsimile device to which the present invention is applied; and 2, a button supported by the upper panel 1a so as to protrude partially through an opening in the panel 1a.

Reference numeral 7 denotes a sheet-like switch typified by a membrane switch provided below the button 2 within the cabinet 1; 8, an intermediate member disposed below the sheet-like switch 7; 9, a switch unit having a protrusion 9a and a pair of electrodes therein in which when the protrusion 9a is depressed, the pair of electrodes comes into contact with each other, which brings about an on state; and 10, a printed wiring board with the switch unit 9 thereon.

Figure 12:
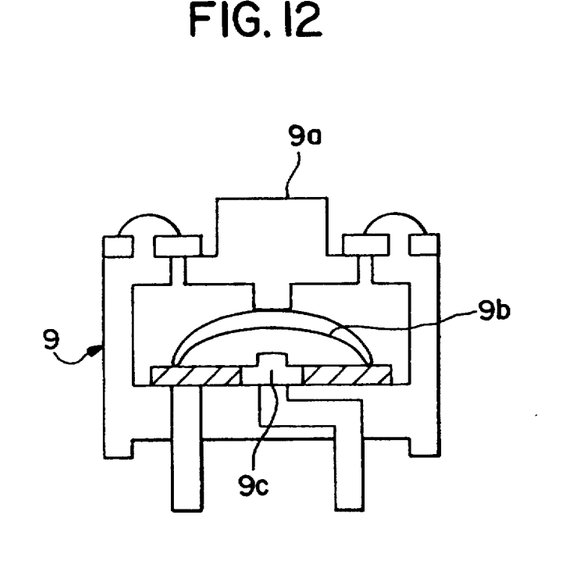
FIG. 12 shows details of the second switch of FIG. 3.

FIG. 12 shows details of switch 9. Spring-like electrode 9b and electrode 9c make contact when protrusion 9a is depressed. When pressure on protrusion 9a is released, electrode 9b resumes its original state and electrodes 9b and 9c separate from one another.

Figure 4:
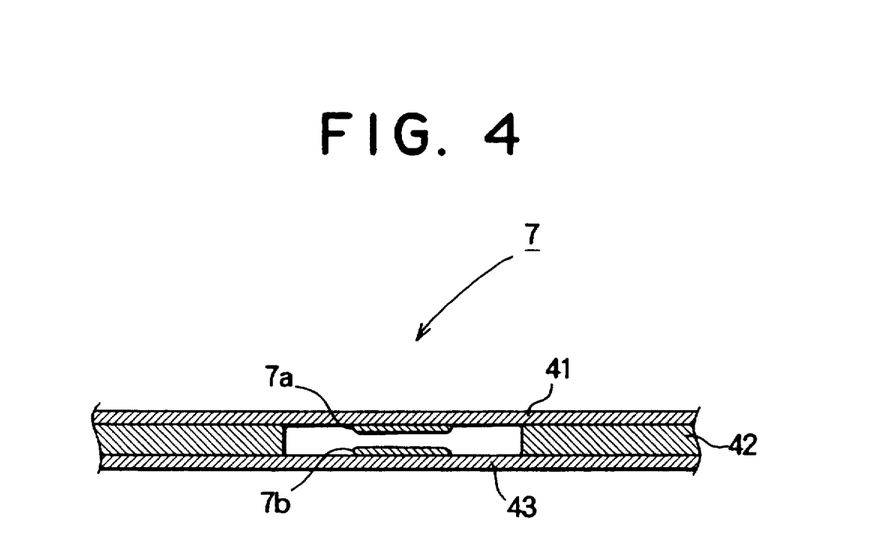
FIG. 4 is a cross-sectional view of a sheet-like switch of the dialing key.

FIG. 4 is a cross-sectional view of the sheet-like switch 7 which includes two parallel sheets 41 and 43, opposite electrodes 7a, 7b provided on the corresponding inner surfaces of the sheets 41 and 43, and a spacer 42 provided between the sheets 41 and 43 so as to prevent contact of the sheets 41 and 43.

Figure 7:
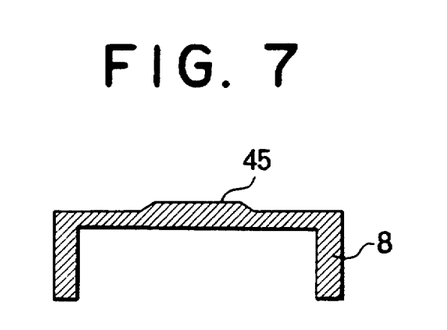
FIG. 7 is a cross-sectional view of the intermediate member incorporated into the dialing key.

As shown in FIG. 3, the sheet-like switch 7 is provided between the button 2 and the intermediate member 8. Provided below the intermediate member 8 is a printed wiring board 10 with the switch unit 9 thereon such that the switch unit 9 is pushed through the intermediate member 8, which has a raised portion 45 on its upper surface at the center thereof opposite the switching function portion of the sheet-like switch 7, as shown in FIG. 7.

The dial key unit 28 includes the sheet switch 7, the intermediate member 8, the switch device 9 and the printed wiring board 10. As shown in FIG. 2, a signal produced by contact of electrodes 7a and 7b of the sheet switch 7 is sent to the telephone circuit 26 through a key output line 28a and a signal produced by contact of electrodes of switch device 9 is sent to the control unit 34 through a key output line 28b. The electrodes 7a and 7b of the sheet switch 7 are completely electrically isolated from the electrodes of the switch device 9 and hence the key output line 28a and the key output line 28b are also electrically isolated from each other. Accordingly the telephone circuit 26 is completely electrically isolated from the control unit 34.

The dialing key operates as follows. When the button 2 is depressed in a direction of an arrow A in FIG. 9, it depresses the intermediate member 8 in the direction of an arrow B through the sheet-like switch 7. At this time, the switch 7 is pressed down between the button 2 and the intermediate member 8, so that the electrodes 7a and 7b come into contact with each other. The intermediate member 8 pushes the switch protrusion 9a in the direction of an arrow C to switch on the switch unit 9, the timing of which is preferably that when the switch unit 9 is arranged so as to operate with a click such that its operation is recognized, it operates after the sheet-like switch 7 has operated, in order to stabilize the switch operation.

Figure 5:
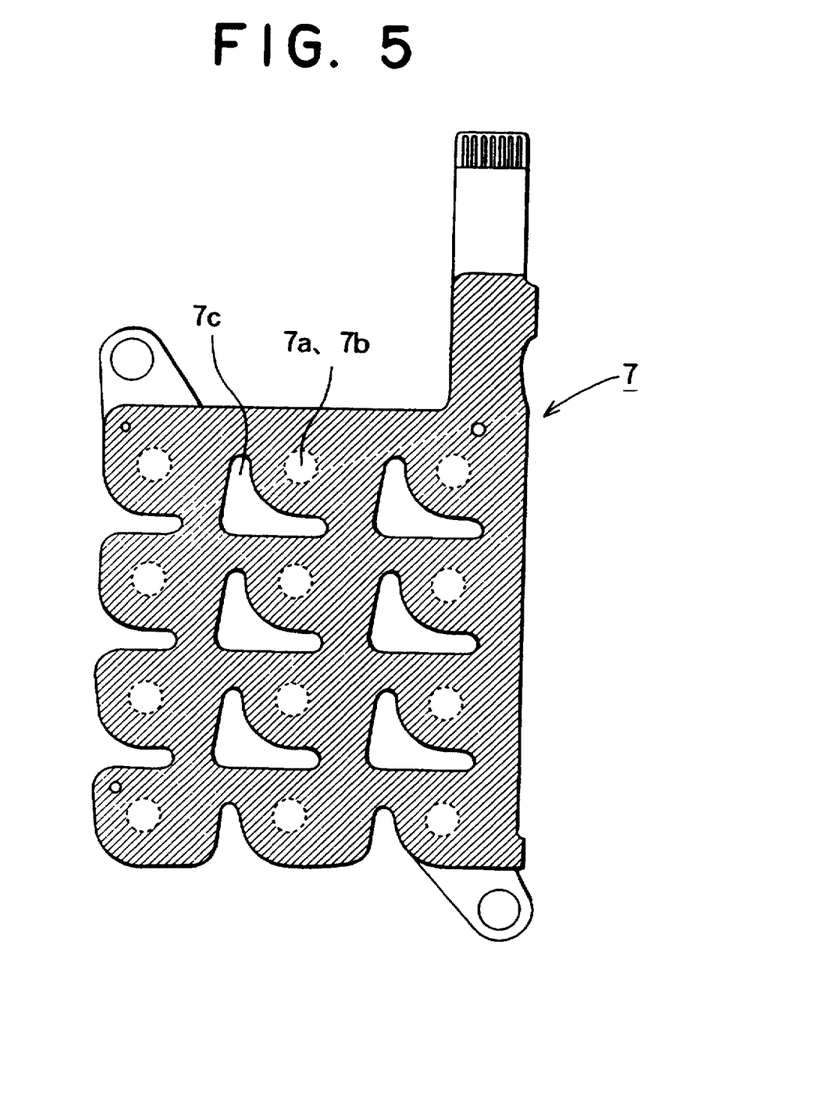
FIG. 5 is a plan view of a sheet-like switch of the dialing key.

The arrangement of the device required for ensuring the operation of the device, as mentioned above, is as follows. FIG. 5 is a plan view of the sheet-like switch 7 of the dialing key section. In FIG. 5, twelve pairs of electrodes 7a, 7b are disposed in the sheet-like switch 7 preferably such that any adjacent pairs of electrodes do not interfere with each other.

As shown in FIG. 5, a cut is provided in the sheet between any two adjacent pairs of electrodes provided near the outer periphery of the sheet while a L-like cut is provided in the sheet between any two adjacent pairs of electrodes provided inward of the sheet to thereby prevent a pair of electrodes from switching on when an adjacent pair of electrodes is impressed with a pressure.

Figure 6:
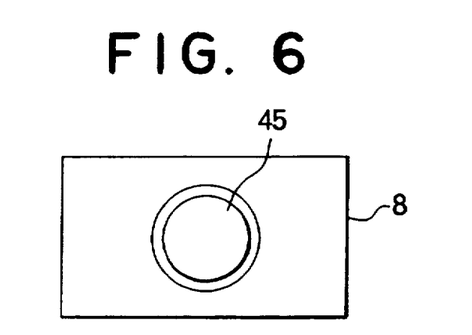
FIG. 6 is a plan view of an intermediate member incorporated into the dialing key.
Figure 8:
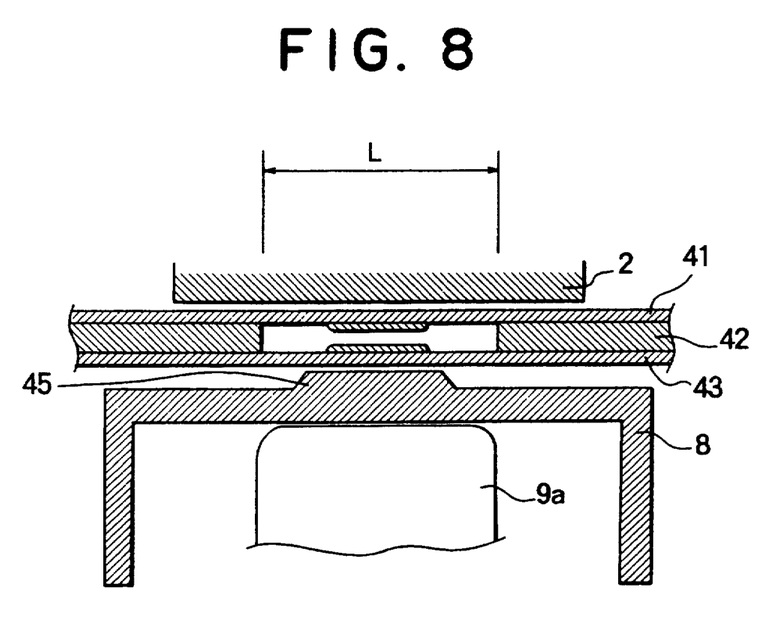
FIG. 8 is a detailed cross-sectional view of the dialing key.

In the present embodiment, a surface of the button 2 which comes into contact with the sheet-like switch 7 is flat while the intermediate member 8 has the raised portion 45, as mentioned above. FIGS. 6 and 7 show one example of the shape of the surface of the intermediate member 8 which comes into contact with the sheet-like switch 7. The diameter of the raised portion 45 is determined by the form of the sheet-like switch 7 and the length L of an electrode space provided in the spacer 42 in the switch 7 (FIG. 8). When L is 6 mm, the diameter of the raised portion 45 is preferably about 3-5 mm and required to be finely adjusted depending on the depressing pressure of the button 2.

For example, as another embodiment, when that surface of the intermediate member 8 which comes into contact with the sheet-like switch 7 is flat, conversely, that surface of the button 2 which comes into contact with the switch 7 should have a raised portion thereon such as is mentioned above, thereby providing a dialing key which performs a further stabilized operation.

According to the present invention, arrangement of two switches one at an upper position and the other at a lower position brings about a further stabilized switch operation compared to the operation of the conventional dialing key with two switches arranged on the same plane and involving obliquity of the button 2 occurring when the button 2 is depressed at one edge. Thus, wiring of the switch unit 9 on the printed wiring board 10 is simplified, which reduces the cost of the dialing key and hence the communication terminal device.

Figure 9:
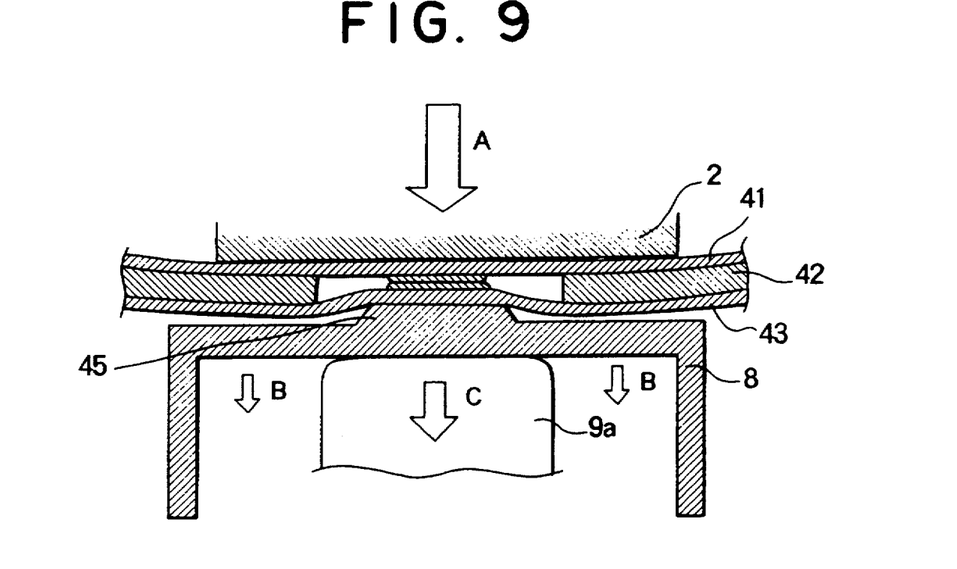
FIG. 9 is a cross-sectional view of the dialing key obtained when its button is depressed.

While in the present embodiment one of the switches is illustrated as being composed of the contact provided on the printed wiring board and the flexible contact, it may be replaced with a regular switch unit 9, as shown in FIG. 9.

While in the present embodiment the communication terminal device is shown as using the facsimile communication unit as the main communication unit, the present invention is applicable to a communication terminal device with a main communication unit which has other functions such as message recording and reproducing functions or a cordless telephone function which uses a commercial power source.

What is claimed is:

1. A communication terminal device comprising:
a main communication unit including an information transmission unit and a control unit;
a telephone circuit;
a dialing key including a button adapted to be pushed by a user, a first and a second switch electrically isolated from one another and arranged linearly with one another such that a pressure applied to said button is applied to said first switch and then to said second switch through pressure applied by said first switch to thereby switch on said first and second switches together;
said telephone circuit including a telephone set and a dial unit, said dial unit receiving a first signal provided by said first switch and generating a dial signal in response to said first signal only when said terminal device is not being supplied with power from an external power source;
said control unit receiving a second signal provided by said second switch and controlling said information unit, in response to said second signal, to generate a dial signal when said terminal device is being supplied with power from the power source;
a line switch means having an off state in which said terminal device is supplied with no power from said power source so that said line switch means is switched to said telephone circuit to thereby connect said telephone circuit to a telephone line and in which said telephone circuit receives power from said telephone line, and an on state in which said terminal device is supplied with power from said power source so that said line switch means is switched to said main communication unit to thereby connect said main communication unit to the telephone line.

2. A terminal device according to claim 1, wherein said first switch comprises a pair of opposing flexible sheets with opposite electrodes one on an inner surface of each sheet and a spacer provided between the flexible sheets of the pair so as to prevent the opposite electrodes from coming into contact with each other.

3. A terminal device according to claim 1, wherein said second switch comprises a pair of electrodes which contact each other to provide an on state when a protrusion of said second switch is depressed.

4. A terminal device according to claim 1, wherein said information transmission unit is a facsimile communication unit.

5. A terminal device according to claim 1, further comprising a power supply for receiving power from the external power source and in turn to supply power to said terminal device.

6. A communication terminal device comprising:
a main communication unit that is for being powered by an external power source;
a telephone circuit enabling a voice communication when the external power source is disabled;
a dialing key including a button adapted to be pushed by a user, a first and a second switch electrically isolated from one another and arranged linearly with one another such that a pressure applied to said button is applied to said first switch and then to said second switch through pressure applied by said first switch to thereby switch on said first and second switches together;
a first dial sending circuit receiving a first signal provided by said first switch, generating a first dial signal in response to said first signal and providing said first dial signal to a telephone line when voice communication is performed through the telephone line;

a second dial sending circuit receiving a second signal provided by said second switch, generating a second dial signal in response to said second signal and providing said second dial signal to the telephone line when communication is performed by the main communication unit; and a line switch means having an off state in which said terminal device is not supplied with power from said power source so that said line switch means is switched to said first dial sending circuit to thereby connect said first dial sending circuit to the telephone line and in which said telephone circuit receives power from said telephone line, and an on state in which said terminal device is supplied with power from said power source so that said line switch means is switched to said second dial sending circuit to thereby connect said second dial sending circuit to the telephone line.

7. A terminal device according to claim 6, further comprising a power supply for receiving power from the external power source and in turn to supply power to said terminal device.

8. A dialing key comprising:

a button which the user is able to depress;

a sheet-like switch comprising a pair of opposing flexible sheets with opposite electrodes one on an inner surface of each sheet and a spacer provided between the flexible sheets of the pair so as to prevent the opposite electrodes from coming into contact with each other;

a switch unit comprising therein a pair of electrodes which come into contact with each other to provide an on state when a protrusion of said switch unit is depressed;

an intermediate member provided between said sheet-like switch and said protrusion of said switch unit; and said button, said sheet-like switch and said switch unit being arranged in a line such that a pressure applied to said button is applied to said sheet-like switch and then to said switch unit through said sheath-like switch and said intermediate member to thereby switch on said sheet-like switch and said switch unit together.

* * * * *